United States Patent
Inami et al.

(10) Patent No.: US 7,628,123 B2
(45) Date of Patent: Dec. 8, 2009

(54) COMBINED HOT WATER SUPPLY SYSTEM

(75) Inventors: Yuki Inami, Nagoya (JP); Kazunari Taguchi, Nagoya (JP)

(73) Assignee: Rinnai Corporation, Nagoya-shi (JP)

(*) Notice: Subject to any disclaimer, the term of this patent is extended or adjusted under 35 U.S.C. 154(b) by 167 days.

(21) Appl. No.: 11/782,287

(22) Filed: Jul. 24, 2007

(65) Prior Publication Data
US 2008/0022946 A1  Jan. 31, 2008

(30) Foreign Application Priority Data
Jul. 26, 2006 (JP) .............................. 2006-203719

(51) Int. Cl.
*F24D 3/08* (2006.01)
(52) U.S. Cl. ..................... 122/448.3; 237/8 R
(58) Field of Classification Search ............... 122/14.2, 122/15.1, 33, 406.1, 448.1, 448.2, 448.3; 237/19, 8 R, 8 A, 8 B, 8 C, 8 D
See application file for complete search history.

(56) References Cited

U.S. PATENT DOCUMENTS

| | | | | |
|---|---|---|---|---|
| 3,770,197 A | * | 11/1973 | Meier | .......................... 237/8 C |
| 3,799,181 A | * | 3/1974 | Maddren | ....................... 137/1 |
| 3,806,026 A | * | 4/1974 | Trotter et al. | ................. 236/23 |
| 3,964,466 A | * | 6/1976 | Ohringer | .................... 122/13.3 |
| 4,346,835 A | * | 8/1982 | Trotter et al. | ................. 236/24 |
| 4,694,783 A | * | 9/1987 | Cleer, Jr. | ................. 122/448.3 |
| 5,988,118 A | * | 11/1999 | Park | ....................... 122/406.1 |
| 6,606,968 B2 | * | 8/2003 | Iwama et al. | ............... 122/18.1 |
| 7,322,532 B2 | * | 1/2008 | Takada et al. | ................. 236/11 |
| 2008/0216770 A1 | * | 9/2008 | Humphrey et al. | ......... 122/13.3 |

FOREIGN PATENT DOCUMENTS

| | | |
|---|---|---|
| JP | 64-041844 | 3/1989 |
| JP | 03-027546 | 3/1991 |
| JP | 2002-357361 | 12/2002 |

* cited by examiner

*Primary Examiner*—Gregory A Wilson
(74) *Attorney, Agent, or Firm*—Rankin, Hill & Clark LLP (57) ABSTRACT

A water heater constituting a combined hot water supply system opens, in starting operation in response to an instruction from a connection controller in STEP 1, a water-supply servo valve to an operation start opening As corresponding to a water quantity slightly larger than an ignition water quantity Fi in STEP 2. In STEP 5, the water heater maintains an opening of the water-supply servo valve at the operation start opening As until a detected temperature Th of a hot-water-supply temperature sensor reaches temperature near a target temperature Ta (Ta−β≦Th≦Ta+α) and limits a water supply quantity from a water supply pipe to be equal to or smaller than a flow rate corresponding to the operation start opening As.

6 Claims, 4 Drawing Sheets

COMBINED HOT WATER SUPPLY SYSTEM

BACKGROUND OF THE INVENTION

1. Field of the Invention

The present invention relates to a combined hot water supply system in which plural water heaters are connected in parallel and operated in association with one another.

2. Description of Related Art

Conventionally, there is known a combined hot water supply system in which plural water heaters are connected to a connecting unit to be capable of communicating with each other and the plural water heaters are operated in association with one another by the connecting unit (see, for example, Japanese Patent Application Laid-Open No. 2002-357361).

In such a combined hot water supply system, since relatively small plural water heaters are connected in parallel and can be operated in association with each other, it is possible to reduce overall manufacturing cost and reduce a minimum hot water supply quantity to increase a variable range of a hot water supply quantity. An on-off valve for switching supply of water from a water supply pipe to a heat exchanger and shut-off of the supply of the water is provided in each of the water heaters. The water heater opens the on-off valve according to an instruction from the connecting unit to start operation.

However, a certain degree of a time delay occurs until a burner is ignited and hot water of a target temperature is actually supplied after the on-off valve is opened and water supply to the water heater is started. During this time delay, hot water of a temperature lower than the target temperature is supplied from the water heater to a hot water supply pipe. Therefore, the hot water of the temperature lower than the target temperature is mixed in hot water of the target temperature already supplied from another water heater already operating. There is an inconvenience in that the temperature of hot water supplied from the hot water supply pipe to a faucet substantially falls and unpleasantness is given to a user.

Therefore, it is an object of the present invention to solve the inconvenience and provide a combined hot water supply system in which, when the number of water heaters in operation is increased, the temperature of hot water supplied to a hot water supply pipe is prevented from substantially falling.

SUMMARY OF THE INVENTION

The present invention has been devised to attain the object. The present invention relates to improvement of a combined hot water supply system in which plural water heaters are connected in parallel to a connection controller and the water heaters are operated in association with one another.

According to a first aspect of the present invention, the connection controller increases the number of water heaters in operation when a predetermined condition for increasing the number of water heaters in operation is satisfied. Each of the water heaters includes a heat exchanger that heats water supplied from a water supply pipe and taps hot water to a hot water supply pipe, a burner that heats the heat exchanger, combustion-amount adjusting means for adjusting a combustion amount of the burner, a water-supply-quantity detecting means for detecting a flow rate of the water supplied from the water supply pipe, a water-supply-quantity adjusting means for adjusting the flow rate of the water supplied from the water supply pipe, a hot-water-supply-temperature detecting means for detecting the temperature of the hot water tapped to the hot water supply pipe, a hot-water-supply control means for controlling, when a flow rate of water equal to or larger than a predetermined ignition water quantity is detected by the water-supply-quantity detecting means, the combustion amount of the burner with the combustion-amount adjusting means such that hot water of a target temperature is tapped to the hot water supply pipe, and a water-supply controlling means for limiting, when operation is started according to an instruction for increasing the number of water heaters in operation from the connection controller, the flow rate of the water supplied from the water supply pipe to be equal to or smaller than a water quantity at operation start, which is equal to or larger than the ignition water quantity and smaller than a maximum flow rate adjustable by the water-supply-quantity adjusting means, with the water-supply-quantity adjusting means from the start of the operation until a detected temperature of the hot-water-supply-temperature detecting means rises to be within a predetermined temperature range set near the target temperature.

According to the aspect of the present invention, the water-supply controlling means provided in the water heater limits, when operation is started according to an instruction for increasing the number of water heaters in operation from the connection controller, the flow rate of the water supplied from the water supply pipe to be equal to or smaller than a water quantity at operation start from the start of the operation until a detected temperature of the hot-water-supply-temperature detecting means rises to be within the predetermined temperature range. Therefore, during a time delay from the operation start until the burner is ignited and the hot water of the target temperature is supplied, a flow rate of the hot water supplied to the hot water supply pipe is limited to be equal to or smaller than the water quantity at operation start. A flow rate of hot water of a temperature lower than the target temperature being mixed in a hot water of the target temperature supplied from a water heater already operating to the hot water supply pipe decreases. Consequently, when the number of water heaters in operation increases, it is possible to prevent the temperature of hot water supplied to a faucet or the like connected to the hot water supply pipe from substantially decreasing and prevent unpleasantness from being given to a user.

When operation of the water heater is started, in the case where a combustion amount of the burner in the another water heater already in operation has decreased, the water-supply controlling means increases, at a first speed that is set lower as a degree of the decrease is larger, a flow rate of the water supplied from the water supply pipe with the water-supply-quantity adjusting means at time when the detected temperature of the hot-water-supply-temperature detecting means rises to be within the predetermined temperature range.

In the aspect of the present invention, when a water heater stopped to operate starts operation according to an increase in the number of water heaters in operation, if a combustion amount of the burner in another water heater already in operation has decreased, it is possible to judge that there is allowance in a water supply ability of the another water heater in operation compared with a hot water supply quantity requested. A degree of this allowance is larger as a degree of the decrease in the combustion amount of the burner is larger.

Thus, when operation of the water heater is started, the water-supply controlling means increase, a flow rate of the water supplied from the water supply pipe at the first speed set lower as the degree of the decrease in the combustion amount of the burner in the another water heater already in operation is larger (the allowance degree of the hot water supply ability is larger compared with the hot water supply quantity requested). Consequently, it is possible to prevent the temperature of the hot water supplied to the hot water supply pipe from fluctuating according to the increase in the flow rate of the water.

It is possible to detect a decrease in the combustion amount of the burner according to an operation state of the combustion-amount adjusting means. It is possible to detect the decrease in the combustion amount according to, for example, an opening of a variable valve that changes a quantity of a fuel gas supplied to the burner or a change in the number of revolution of a fan that supplies a combustion air to the burner. The combustion amount of the burner is changed by the hot-water-supply controlling means according to an increase or decrease in a flow rate of the water supplied from the water supply pipe. Thus, it is also possible to detect a decrease in the combustion amount of the burner according to a change in the flow rate of the water supplied from the water supply pipe.

When operation of the water heater is started, in the case where a combustion amount of the burner in the another water heater already in operation has not decreased, the water-supply controlling means can increase, at a second speed that is higher than the first speed, a flow rate of the water supplied from the water supply pipe with the water-supply-quantity adjusting means at time when the detected temperature of the hot-water-supply-temperature detecting means rises to be within the predetermined temperature range.

According to the aspect of the present invention, when operation of the water heater is started, if a combustion amount of the burner in another water heater already in operation has not decreased, it is possible to judge that there is no allowance in a water supply ability of the another water heater already in operation compared with a hot water supply quantity requested.

Thus, in this case, the water-supply controlling means increases a flow rate of the water supplied from water supply pipe at the second speed higher than the first speed, and promptly increases a supply quantity of the hot water supplied from the water heater started to operate. Consequently, it is possible to prevent an actual hot water quantity from being insufficient compared with the hot water supply quantity requested.

According to a second aspect of the present invention, the connection controller increases the number of water heaters in operation when a predetermined condition for increasing the number of water heaters in operation is satisfied. Each of the water heaters includes a heat exchanger that heats water supplied from a water supply pipe and taps hot water to a hot water supply pipe, a burner that heats the heat exchanger, combustion-amount adjusting means for adjusting a combustion amount of the burner, water-supply-quantity detecting means for detecting a flow rate of the water supplied from the water supply pipe, water-supply-quantity adjusting means for adjusting the flow rate of the water supplied from the water supply pipe, hot-water-supply-temperature detecting means for detecting the temperature of the hot water tapped to the hot water supply pipe, hot-water-supply control means for controlling, when a flow rate of water equal to or larger than an ignition water quantity is detected by the water-supply-quantity detecting means, the combustion amount of the burner with the combustion-amount adjusting means such that hot water of a target temperature is tapped to the hot water supply pipe, and water-supply controlling means for limiting, when operation is started according to an instruction for increasing the number of water heaters in operation from the connection controller, the flow rate of the water supplied from the water supply pipe to be equal to or smaller than a water quantity at operation start, which is equal to or larger than the ignition water quantity and smaller than a maximum flow rate adjustable by the water-supply-quantity adjusting means, with the water-supply-quantity adjusting means from the start of the operation until a predetermined time elapses.

According to the aspect of the present invention, the water-supply controlling means provided in the water heater limits, when operation is started according to an instruction for increasing the number of water heaters in operation from the connection controller, the flow rate of the water supplied from the water supply pipe to be equal to or smaller than a water quantity at operation start from the start of the operation until the predetermined time elapses. Therefore, during a time delay from the operation start until the turner is ignited and the hot water of the target temperature is supplied, a flow rate of the hot water supplied to the hot water supply pipe is limited to be equal to or smaller than the water quantity at operation start. A flow rate of hot water of a temperature lower than the target temperature mixed in a hot water supplied from a water heater already operating to the hot water supply pipe decreases. Consequently, when the number of water heaters in operation increases, it is possible to prevent the temperature of hot water supplied to a faucet or the like connected to the hot water supply pipe from substantially decreasing and prevent unpleasantness from being given to a user.

In the second aspect of the present invention, when operation of the water heater is started, in the case where a combustion amount of the burner in the another water heater already in operation has decreased, the water-supply controlling means increases, at a first speed that is set lower as a degree of the decrease is larger, a flow rate of the water supplied from the water supply pipe with the water-supply-quantity adjusting means at time when the predetermined time elapses.

In the aspect of the present invention, when the water heater starts operation, if a combustion amount of the burner in another water heater already in operation has decreased, it is possible to judge that there is allowance in a water supply ability of the another water heater in operation compared with a hot water supply quantity requested. A degree of this allowance becomes larger as a degree of the decrease in the combustion amount of the burner becomes larger.

Thus, when operation of the water heater is started, the water-supply controlling means increase a flow rate of the water supplied from the water supply pipe at the first speed set lower as the degree of the decrease in the combustion amount of the burner in the another water heater already in operation is larger (the allowance degree of the hot water supply ability is larger compared with the hot water supply quantity requested). Consequently, it is possible to prevent the temperature of the hot water supplied to the hot water supply pipe from fluctuating according to the increase in the flow rate of the water.

When operation of the water heater is started, in the case where a combustion amount of the burner in the another water heater already in operation has not decreased, the water-supply controlling means can increase, at a second speed that is higher than the first speed, a flow rate of the water supplied from the water supply pipe with the water-supply-quantity adjusting means at a time when the predetermined time elapses.

According to the aspect of the present invention, when operation of the water heater is started, if a combustion amount of the burner in another water heater already in operation has not decreased, it is possible to judge that there is no allowance in a water supply ability of the another water heater already in operation compared with a hot water supply quantity requested.

Thus, in this case, the water-supply controlling means increases a flow rate of the water supplied from water supply pipe at the second speed higher than the first speed, and promptly increases a supply quantity of the hot water supplied from the water heater started to operate. Consequently, it is possible to prevent an actual hot water quantity from being insufficient compared with the hot water supply quantity requested.

DETAILED DESCRIPTION OF THE PREFERRED EMBODIMENTS

Figure 1:
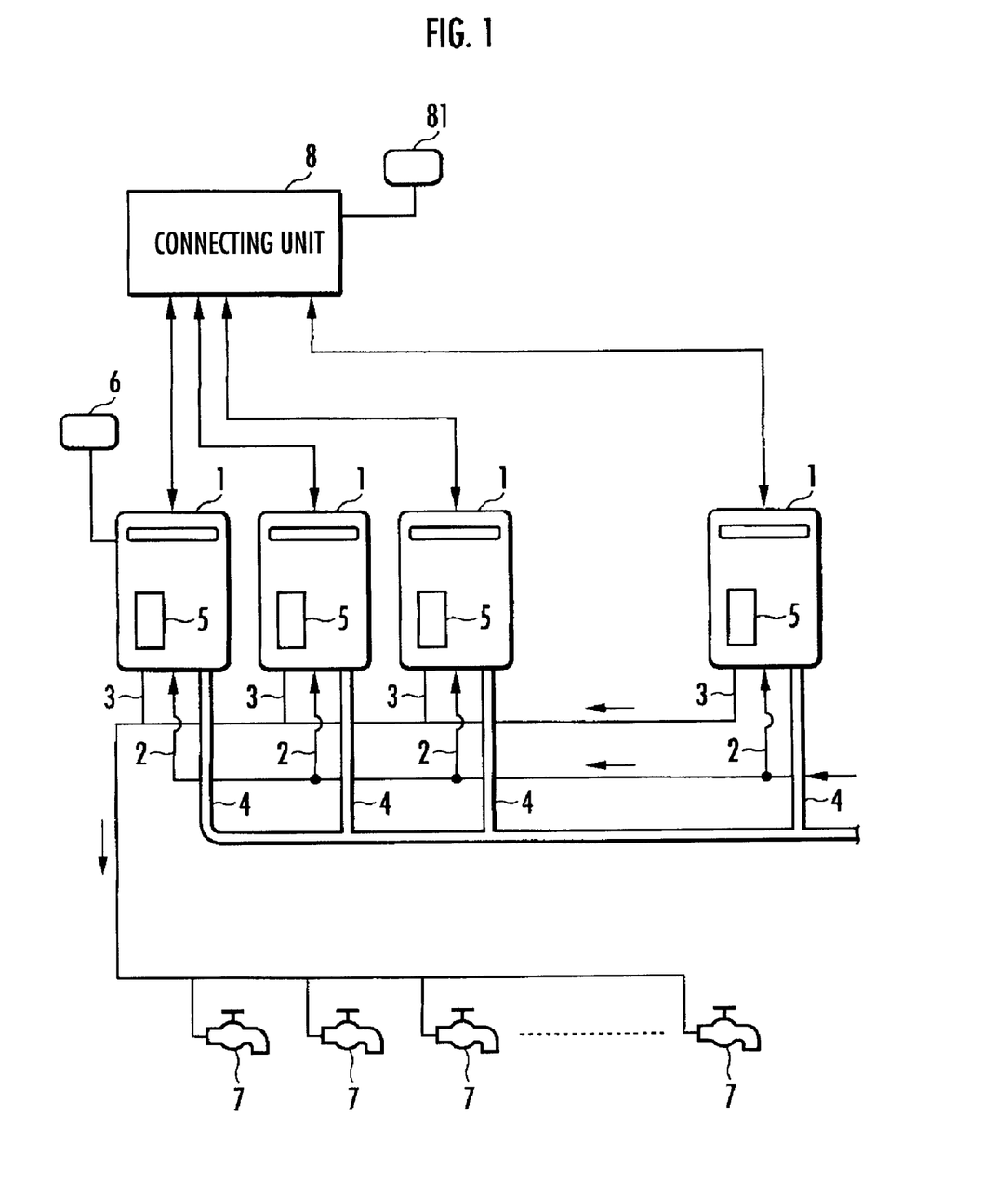
FIG. 1 is a diagram of a combined hot water supply system according to the present invention.
Figure 2:
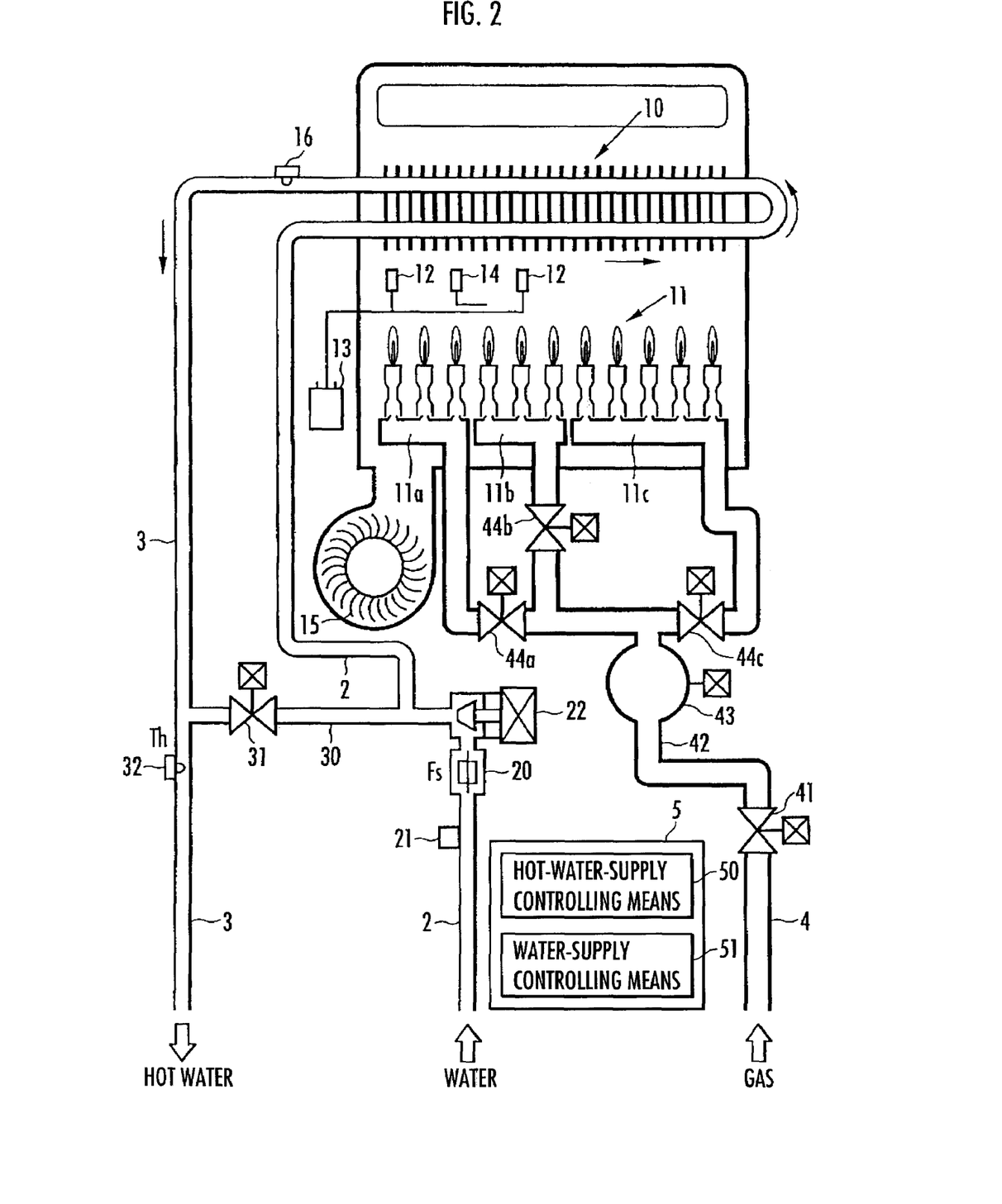
FIG. 2 is a diagram of a water heater shown in FIG. 1.
Figure 3:
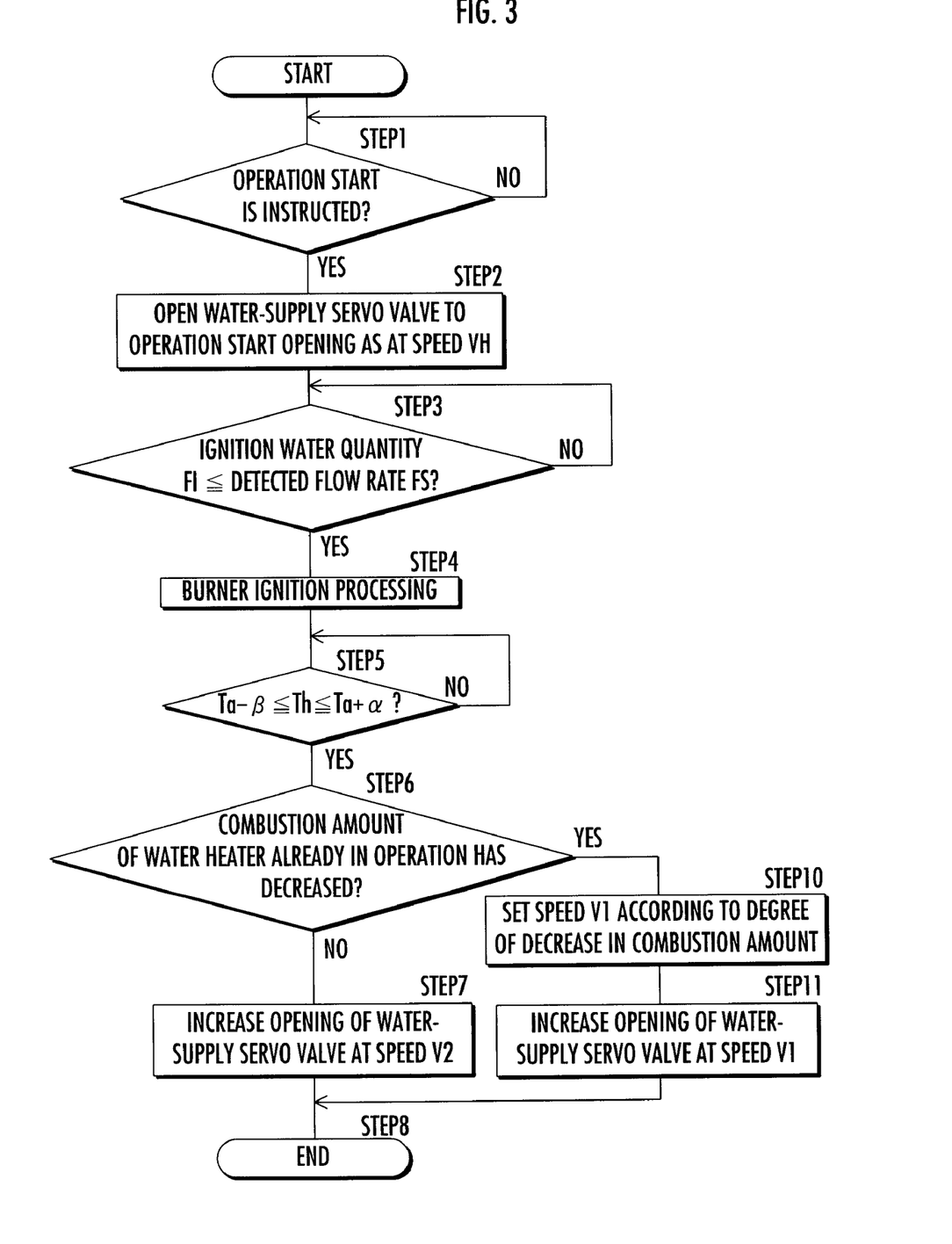
FIG. 3 is an operation flowchart of the water heater during the start of operation.
Figure 4:
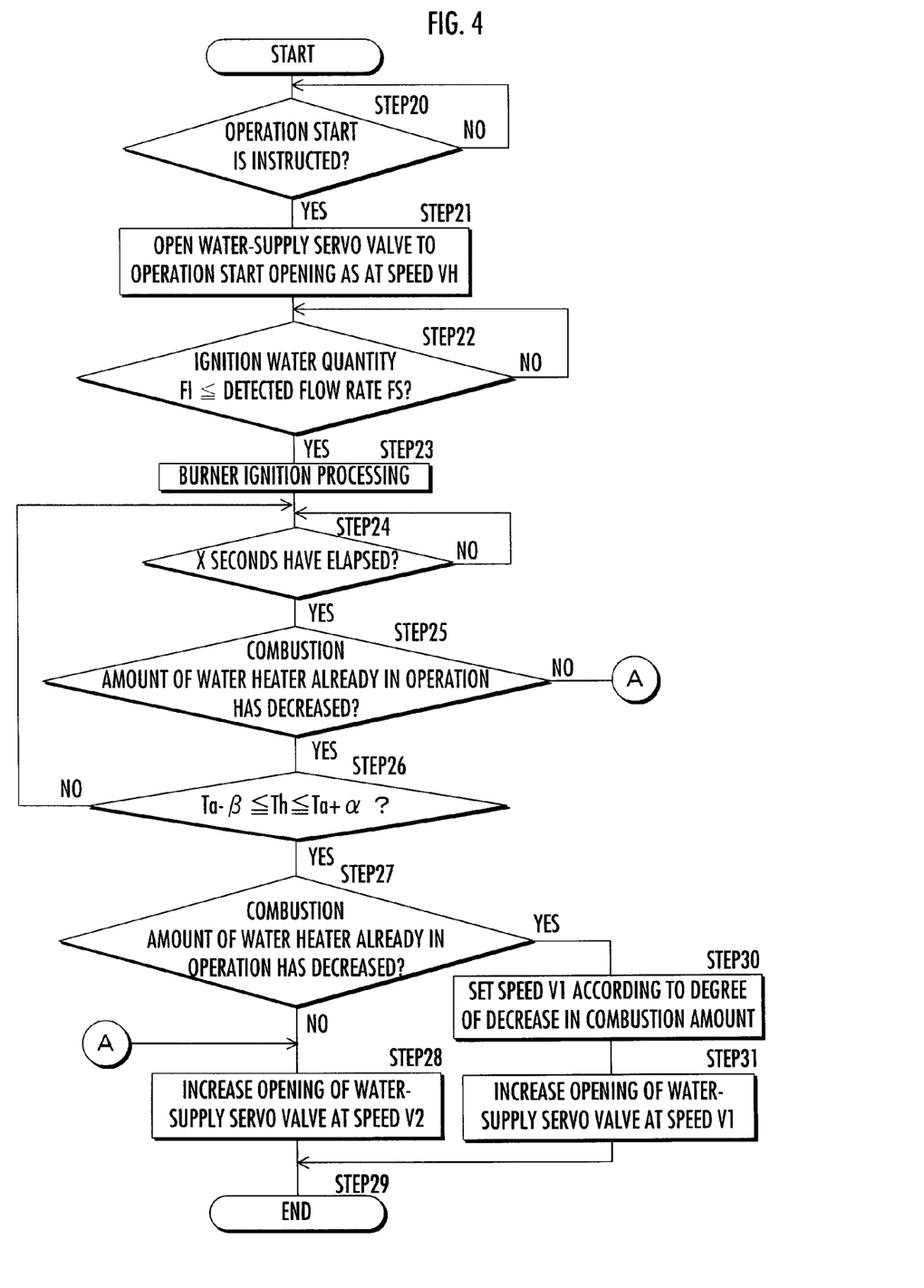
FIG. 4 is an operation flowchart of the water heater during the start of operation.

An embodiment of the present invention will be explained with reference to FIGS. 1 to 4. FIG. 1 is a diagram of a combined hot water supply system according to the present invention. FIG. 2 is a diagram of a water heater shown in FIG. 1. FIGS. 3 and 4 are operation flowcharts of the water heater during the start of operation.

Referring to FIG. 1, in the combined hot water supply system, plural water heaters 1 are connected to a connecting unit 8 to be capable of communicating with each other. A remote controller 6 for performing switching of operation and stop, setting of a hot water supply temperature, and the like is connected to any one of the water heaters 1. A remote controller 81 is connected to the connecting unit 8.

As explained in detail later, each of the water heaters 1 has built therein a burner connected to a gas supply pipe 4 and a heat exchanger heated by the burner. Water supplied from a water supply pipe 2 connected to the heat exchanger is heated to be hot water while circulating through the heat exchanger and tapped to a hot water supply pipe 3. The operation of the water heater 1 is controlled by a control unit 5, which is an electronic unit including a microcomputer.

In this embodiment, the connecting unit 8 is provided separately from the water heaters 1. However, a function of the connecting unit 8 may be included in the control unit 5 of any one of the water heaters 1.

As shown in FIG. 2, each water heater 1 includes a heat exchanger 10 that communicates with the water supply pipe 2 and the hot water supply pipe 3, a burner 11 that heats the heat exchanger 10, an ignition plug 12 for igniting the burner 11, an igniter 13 that applies a high voltage to the ignition plug 12, a frame rod 14 that detects the presence or absence of combustion flame of the burner 11, a combustion fan 15 that supplies a combustion air to the burner 11, and a heat exchange temperature sensor 16 that detects the temperature of hot water tapped from the heat exchanger 10. The burner 11 includes a first burner block 11a, a second burner block 11b, and a third burner block 11c.

Moreover, the water heater 1 includes a water-supply flow rate sensor 20 (equivalent to the water-supply-quantity detecting means of the present invention) that detects a flow rate of the water supplied from the water supply pipe 2, a water-supply temperature sensor 21 that detects the temperature of the water supplied from the water supply pipe 2, and a water-supply servo valve 22 (equivalent to the water-supply-quantity adjusting means of the present invention).

In a bypass pipe 30 that bypasses the heat exchanger 10 and communicates with the water supply pipe 2 and the hot water supply pipe 3, a bypass servo valve 31 that adjusts an opening of the bypass pipe 30 is provided. A hot-water-supply temperature sensor 32 (equivalent to the hot-water-temperature detecting means of the present invention) that detects the temperature of the hot water supplied to the hot water pipe 3 is provided downstream of a merging section of the hot water supply pipe 3 and the bypass pipe 30.

The water heater 1 also includes a main solenoid valve 41 that opens and closes the gas supply pipe 4 through which a fuel gas is supplied, a gas proportional valve 43 that adjusts an opening of a hot-water-supply gas pipe 42 extended from the gas supply pipe 4, a first changeover solenoid valve 44a that switches supply the fuel gas from the hot-water-supply gas pipe 42 to the first burner block 11a and shut-off of the supply of the fuel gas, a second changeover solenoid valve 44b that switches supply of the fuel gas from the hot-water-supply gas pipe 42 to the second burner block 11b and shut-off of the supply of the fuel gas, and a third changeover solenoid valve 44c that switches supply of the fuel gas from the hot-water-supply gas pipe 42 to the third burner block 11c and shut-off of the supply of the fuel gas.

The combustion-amount adjusting means of the present invention is constituted by the gas proportional valve 43, the first changeover solenoid valve 44a, the second changeover solenoid valve 44b, the third changeover solenoid valve 44c, and the combustion fan 15.

Signals for instructing operation and stop of the water heater 1, setting of operation conditions, and the like are inputted to the control unit 5 from the connecting unit 8. Detection signals from the frame rod 14, the heat exchange temperature sensor 16, the water-supply flow rate sensor 20, the water-supply temperature sensor 21, and the hot-water-supply temperature sensor 32 are also inputted to the control unit 5.

Operations of the igniter 13, the combustion fan 15, the water-supply servo valve 22, the bypass servo valve 31, the main solenoid valve 41, the gas proportional valve 43, the first changeover solenoid valve 44a, the second changeover solenoid valve 44b, and the third changeover solenoid valve 44c are controlled by control signals outputted from the control unit 5. The control unit 5 detects a combustion amount of the burner 11 from open/close operation states of the first changeover solenoid valve 44a, the second changeover solenoid valve 44b, and the third changeover solenoid valve 44c and an opening of the gas proportional valve 43.

The control unit 5 executes a program stored in a memory in advance with a microcomputer to function as hot-water-supply controlling means 50 and water-supply control means 51. The hot-water-supply controlling means 50 opens the water-supply servo valve 22 when the water heater 1 is in an operation state. When a flow rate of the water detected by the water-supply flow rate sensor 20 increases to be equal to or larger than an ignition water quantity set in advance, the hot-water-supply controlling means 50 supplies the combustion air to the burner 11 with the combustion fan 15 and applies a high voltage to the ignition plug 12 with the igniter 13 to cause spark discharge. In this state, the hot-water-supply controlling means 50 opens the main solenoid valve 41 and the first to third changeover solenoid valves 44a to 44c to ignite the burner 11.

The hot-water-supply controlling means 50 performs adjustment of open and close of the first to third changeover solenoid valves 44a to 44c, adjustment of an opening of the gas proportional valve 43, and adjustment of the number of revolutions of the combustion fan 15 so as to control a combustion amount of the burner 11 such that the temperature of the hot water supplied to the hot water supply pipe 3, which is detected by the hot-water-supply temperature sensor 32, reaches a target temperature (set by the remote controllers 6 and 81). Further, when a faucet 7 attached to the end of the hot water supply pipe 3 is closed and a supply flow rate of the water from the water supply pipe 2, which is detected by the water-supply flow rate sensor 20, decreases to be smaller than the ignition water quantity, the hot-water-supply controlling means 50 closes the main solenoid valve 41, the gas proportional valve 43, the first changeover solenoid valve 44a, the second changeover solenoid valve 44b, and the third changeover solenoid valve 44c to stop the combustion of the burner 11.

In FIG. 1, when any one of faucets 7 is opened and hot water flows through the hot water supply pipe 3, the control unit 5 of each of the water heaters 1 transmits water-supply flow rate data indicating a flow rate of water detected by the water-supply flow rate sensor 20 to the connecting unit 8. A range of a flow rate of the water supplied from the water supply pipe 2 to each of the water heaters 1 (a flow rate of the hot water supplied to the hot water supply pipe 3) is set to, for example, three stages of "low", "medium", and "high".

In the system configuration in FIG. 1, the five water heaters 1 are connected to the connecting unit 8. For example, when the water-supply servo valves 22 of the three water heaters 1 among the five water heaters 1 are opened and the water-supply servo valves 22 of the remaining two water heaters 1 are closed, the three water heaters 1, the water-supply servo valves 22 of which are open, are in an operation state.

When all supply flow rates of the water from the water supply pipes 2 in the three water heaters 1 in the operation state are in the range of "medium", the connecting unit 8 maintains a state in which the three water heaters 1 are operating. When the hot water supply quantity from the faucet 7 has decreased and any one of the supply water quantities of the three water heaters 1 has decreased to come into the range of "low", the connecting unit 8 brings one of the three water heaters 1 in the operation state into a stopped state (closes the water-supply servo valve 22) and changes the state in which the three water heaters 1 are operating to a state in which the two water heaters 1 are operating.

When both supply flow rates of the water from the water supply pipes 2 in the two water heaters 1 are "medium", the connecting unit 8 maintains the state in which the two water heaters 1 are operating. When a supply flow rate of the water from the water supply pipe 2 in one more water heater 1 has decreased to the range of "low", the connecting unit 8 stops the operation of any one of the water heaters 1 and changes the state to a state in which only one water heater 1 is operating.

Conversely, in a state in which a part of the water heaters 1 are operating, when a flow rate of any one of the water heaters 1 in operation increases to "high", the connecting unit 8 brings one of the water heaters 1 stopped into an operating state (opens the water-supply servo valve 22).

Processing at the time when the water heater 1, which receives a control signal for instructing operation start transmitted from the connecting unit 8, starts operation (equivalent to the time when the water heater 1 starts operation according to an instruction to increase the number of water heaters in operation in the present invention) when the number of water heaters 1 in operation is increased in this way will be explained in accordance with a flowchart shown in FIG. 3.

When the water heater 1 in a stopped state receives a control signal for instructing operation start from the connecting unit 8 in STEP 1 in FIG. 3, the process proceeds to STEP 2. STEP 2 is processing by the water-supply controlling means 51. The water-supply controlling means 51 opens the water-supply servo valve 22 to an operation start opening As at a maximum speed vh. The operation start opening As is an opening corresponding to a flow rate slightly larger than an ignition water quantity Fi (equivalent to the operation start flow rate of the present invention).

Subsequent STEP 3 and STEP 4 are processing by the hot-water-supply controlling means 50. The hot-water-supply controlling means 50 proceeds to STEP 4 when a detected flow rate Fs of the water-supply flow rate sensor 20 increases to be equal to or larger than the ignition water quantity Fi in STEP 3 and performs ignition processing for the burner 11.

The next STEP 5 to STEP 7 and STEP 10 to STEP 11 are processing by the water-supply controlling means 51. The water-supply controlling means 51 proceeds to STEP 6 when a detected temperature Th of the hot-water-supply temperature sensor 32 rises to a temperature range (Ta−β≦Th≦Ta+α, α and β are constants set in advance) set near a target temperature Ta in STEP 5.

In this case, until the temperature of the hot water supplied to the hot water supply pipe 3 rises to temperature near the target temperature Ta, a water supply quantity from the water supply pipe 2 is limited to a flow rate corresponding to the operation start opening As. Therefore, until the burner 11 is ignited in the water heater 1 started to operate and the hot water of the target temperature Ta is supplied to the hot water supply pipe 3, a flow rate of the hot water and the water at a low temperature equal to or lower than the target temperature Ta supplied to the hot water supply pipe 3 is controlled. Consequently, it is possible to reduce a width of the fall in temperature of the hot water supplied from the faucet 7, which is caused by mixing of the water and the water of the low temperature with the hot water of the target temperature Ta supplied from another water heater 1 already in operation.

In STEP 6, the water-supply controlling means 51 judges whether a combustion amount of the water heater 1 already in operation has decreased or not. For this judgment, the water heater 1 in operation always transmits combustion amount data indicating a combustion amount of the burner 11 to the connecting unit 8. The connecting unit 8 monitors a change in the combustion amount of the burner 11 of the water heater 1 in operation from the combustion amount data received.

When the number of water heaters 1 in operation is increased, the connecting unit 8 transmits combustion amount change data indicating the change in the combustion amount to the water heater 1 started to operate and transmits data on speeds (v1, v2, and v3) of the water supply servo valve 22 described later.

The hot-water controlling means 50 provided in the water heater 1 determines, from the detected temperature of the water-supply temperature sensor 21 and the detected flow rate of the water-supply flow rate sensor 20, a combustion amount of the burner 11 necessary for obtaining hot water of the target temperature Ta. Therefore, it is possible to set data indicating the combustion amount of the burner 11 as the combustion amount data.

The hot-water-supply controlling means 50 performs open and close of the first to third changeover solenoid valves 44a to 44c, adjustment of an opening of the gas proportional valve 43, and adjustment of the number of revolutions of the combustion fan 15. Therefore, a decrease in the combustion amount of the burner 11 may be detected using data indicating levels of these adjustments. The combustion amount of the burner 11 is changed by the hot-water supply controlling means 50 according to the detected water quantity of the water-supply flow rate sensor 20. Thus, a decrease in the combustion amount of the burner 11 may be detected using data of the detected water quantity of the water-supply flow rate sensor 20.

In this way, the water-supply controlling means 51 judges whether the combustion amount of the water heater already in operation has decreased. When the combustion amount of the water heater already in operation has decreased, the processing branches from STEP 6 to STEP 10. In STEP 10, the water-supply controlling means 51 sets, according to a degree of the decrease in the combustion amount of the water heater already in operation, a speed v1 (equivalent to the first speed of the present invention) lower as the degree of the decrease is larger.

As specific setting of the speed v1, for example, data of a correspondence map of decrease degrees of a combustion amount and the speed v1 is stored in a memory in advance and a decrease degree of the combustion amount is applied to the correspondence map to acquire the speed v1.

In the next STEP 11, the water-supply controlling means 51 opens the water-supply servo valve 22 to a maximum opening at the speed v1, proceeds to STEP 8, and finishes the processing. In this way, the opening of the water-supply servo valve 22 is increased at the speed v1 set lower as the decrease degree of the combustion amount of the water heater 1 already in operation is larger. Consequently, when a decrease degree of a combustion amount of another water heater 1 already in operation is larger compared with a requested hot water supply quantity, it is possible to control fluctuation in a hot water supply temperature. When a decrease degree of the combustion amount of the another water heater 1 already in operation is smaller compared to the requested hot water supply quantity, it is possible to promptly increase a hot water supply quantity.

On the other hand, when the combustion amount of the water heater 1 already in operation has not decreased in STEP 6, it is possible to judge that there is no allowance in the ability of the water heater 1 already in operation compared to the requested hot water supply quantity. Thus, in this case, the water-supply controlling means 51 proceeds to STEP 7. In STEP 7, the water-supply controlling means 51 opens the water-supply servo valve 22 to the maximum opening at a speed v2 (v1<v2≦vh) set higher than the setting range of v1, proceeds to STEP 8, and finishes the processing. The water-supply controlling means 51 may open the water-supply servo valve 22 to the maximum opening at the maximum speed vh rather than v2.

Consequently, when there is no allowance in the ability of the water heater 1 already in operation compared with the requested hot water supply quantity, it is possible to promptly increase the hot water supply quantity from the water heater 1 started to operate and secure a hot water supply quantity corresponding to the requested hot water supply quantity.

In this embodiment, in STEP 5 in FIG. 3, the water supply quantity is limited by the opening of the water-supply servo valve 22 set to the operation start opening As until the detected temperature Th of the hot-water-supply temperature sensor 32 reaches temperature near the target temperature Ta (Ta−β≦Th≦Ta+α). However, the water supply quantity may be limited by the opening of the water-supply servo valve 22 set to the operation start opening As until a predetermined time elapses. In this case, the predetermined time is determined taking into account a delay time until hot water of the target temperature Ta is supplied after the water heater 1 starts operation according to an operation start instruction from the connecting unit 8.

In this embodiment, in STEP 6 in FIG. 3, speed for further opening the water-supply servo valve 22 is switched to v1 and v2 according to whether the combustion amount of the water heater 1 already in operation has decreased. However, it is possible to obtain the effects of the present invention even when the switching of the speed is not performed.

In this embodiment, when the number of water heater 1 in operation is increased, the water heater 1 having received the control signal for instructing operation start transmitted from the connecting unit 8 performs the processing of starting operation according to the flowchart shown in FIG. 3. However, the processing of starting operation may be performed according to a flow chart shown in FIG. 4.

STEP 20 to STEP 23 in the flowchart in FIG. 4 are the same as STEP 1 to STEP 4 in FIG. 3. STEP 24 to STEP 28 and STEP 30 to STEP 31 are processing by the water-supply controlling means 51. The water-supply controlling means 51 proceeds to STEP 25 when x seconds (0≦x) elapses after ignition of the burner 11 in STEP 24.

In STEP 25, the water-supply controlling means 51 judges whether a combustion amount of the water heater 1 already in operation has decreased. When the combustion amount of the water heater 1 already in operation has decreased, the water-supply controlling means 51 proceeds to STEP 26. In STEP 26, the water-supply controlling means 51 judges whether the detected temperature Th of the hot-water-supply temperature sensor 32 is within the temperature range set near the target temperature Ta. When the combustion amount of the water heater 1 already in operation has not decreased, the processing branches to STEP 28.

STEP 28 is processing same as STEP 7 in FIG. 3. The water-supply controlling means 51 opens the water-supply servo valve 22 to the maximum opening at a speed v2 (v1<v2≦vh). The water-supply controlling means 51 may open the water-supply servo valve 22 to the maximum opening at the maximum speed vh rather than v2.

In this way, in the flowchart in FIG. 4, the judgment in STEP 25 on whether the combustion amount of the water heater already in operation has decreased is performed prior to the judgment in STEP 26 on whether the hot water supply temperature Th is within the temperature range set near the target temperature Ta. Consequently, when the combustion amount of the water heater 1 already in operation has decreased when the number of water heaters 1 is increased, it is possible to immediately open, at the speed v2 or vh, the water-supply servo valve 22 of the water heater 1 started to operate and promptly increase a hot water supply quantity. Processing in STEP 27 to STEP 28 and STEP 30 to STEP 31 is the same as the processing in STEP 6 to STEP 7 and STEP 10 to STEP 11 in FIG. 3.

What is claimed is:

1. A combined hot water supply system in which plural water heaters are connected in parallel to a connection controller and the water heaters are operated in association with one another, wherein
the connection controller increases the number of water heaters in operation when a predetermined condition for increasing a number of water heaters in operation is satisfied, and
each of the water heaters includes:
a heat exchanger that heats water supplied from a water supply pipe and taps hot water to a hot water supply pipe;
a burner that heats the heat exchanger;
a combustion-amount adjusting means for adjusting a combustion amount of the burner;
a water-supply-quantity detecting means for detecting a flow rate of the water supplied from the water supply pipe;

a water-supply-quantity adjusting means for adjusting the flow rate of the water supplied from the water supply pipe;

a hot-water-supply-temperature detecting means for detecting temperature of the hot water tapped to the hot water supply pipe;

a hot-water-supply control means for controlling, when a flow rate of water equal to or larger than a predetermined ignition water quantity is detected by the water-supply-quantity detecting means, the combustion amount of the burner with the combustion-amount adjusting means such that hot water of a target temperature is tapped to the hot water supply pipe; and a water-supply controlling means for limiting, when operation is started according to an instruction for increasing the number of water heaters in operation from the connection controller, the flow rate of the water supplied from the water supply pipe to be equal to or smaller than a water quantity at operation start, which is equal to or larger than the ignition water quantity and smaller than a maximum flow rate adjustable by the water-supply-quantity adjusting means, with the water-supply-quantity adjusting means from the start of the operation until a detected temperature of the hot-water-supply-temperature detecting means rises to be within a predetermined temperature range set near the target temperature.

2. The combined hot water supply system according to claim 1, wherein, when operation of the water heater is started, in the case where a combustion amount of the burner in the another water heater already in operation has decreased, the water-supply controlling means increases, at a first speed that is set lower as a degree of the decrease is larger, a flow rate of the water supplied from the water supply pipe with the water-supply-quantity adjusting means at time when the detected temperature of the hot-water-supply-temperature detecting means rises to be within the predetermined temperature range.

3. The combined hot water supply system according to claim 2, wherein, when operation of the water heater is started, in the case where a combustion amount of the burner in the another water heater already in operation has not decreased, the water-supply controlling means increases, at a second speed that is higher than the first speed, a flow rate of the water supplied from the water supply pipe with the water-supply-quantity adjusting means at time when the detected temperature of the hot-water-supply-temperature detecting means rises to be within the predetermined temperature range.

4. A combined hot water supply system in which plural water heaters are connected in parallel to a connection controller and the water heaters are operated in association with one another, wherein the connection controller increases the number of water heaters in operation when a predetermined condition for increasing a number of water heaters in operation is satisfied, and each of the water heaters includes:

a heat exchanger that heats water supplied from a water supply pipe and taps hot water to a hot water supply pipe;

a burner that heats the heat exchanger;

combustion-amount adjusting means for adjusting a combustion amount of the burner;

water-supply-quantity detecting means for detecting a flow rate of the water supplied from the water supply pipe;

water-supply-quantity adjusting means for adjusting the flow rate of the water supplied from the water supply pipe;

hot-water-supply-temperature detecting means for detecting temperature of the hot water tapped to the hot water supply pipe;

hot-water-supply control means for controlling, when a flow rate of water equal to or larger than a predetermined ignition water quantity is detected by the water-supply-quantity detecting means, the combustion amount of the burner with the combustion-amount adjusting means such that hot water of a target temperature is tapped to the hot water supply pipe; and water-supply controlling means for limiting, when operation is started according to an instruction for increasing the number of water heaters in operation from the connection controller, the flow rate of the water supplied from the water supply pipe to be equal to or smaller than a water quantity at operation start, which is equal to or larger than the ignition water quantity and smaller than a maximum flow rate adjustable by the water-supply-quantity adjusting means, with the water-supply-quantity adjusting means from the start of the operation until a predetermined time elapses.

5. The combined hot water supply system according to claim 4, wherein, when operation of the water heater is started, in the case where a combustion amount of the burner in the another water heater already in operation has decreased, the water-supply controlling means increases, at a first speed that is set lower as a degree of the decrease is larger, a flow rate of the water supplied from the water supply pipe with the water-supply-quantity adjusting means at time when the predetermined time elapses.

6. The combined hot water supply system according to claim 5, wherein, when operation of the water heater is started, in the case where a combustion amount of the burner in the another water heater already in operation has not decreased, the water-supply controlling means increases, at a second speed that is higher than the first speed, a flow rate of the water supplied from the water supply pipe with the water-supply-quantity adjusting means at time when the predetermined time elapses.

* * * * *